June 19, 1923.
W. H. MARSHALL
HUMIDIFIER FOR INTERNAL COMBUSTION ENGINES
Filed July 2, 1917
1,459,183
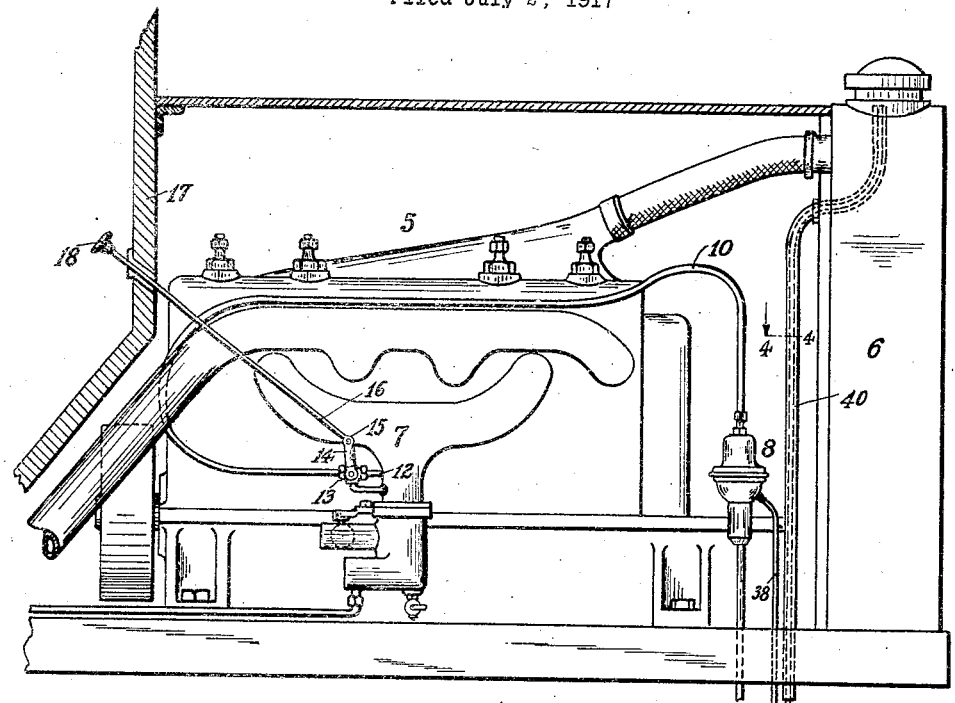
Fig. 1.
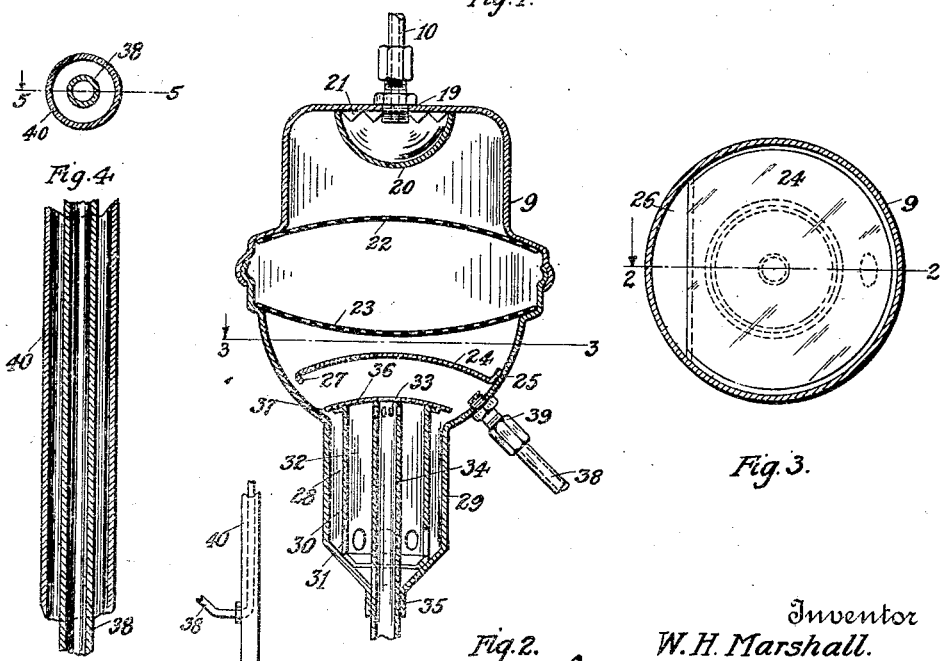
Fig. 4.
Fig. 5.
Fig. 6.
Fig. 2.
Fig. 3.
Inventor
W. H. Marshall.
Attorney Patented June 19, 1923.

1,459,183

UNITED STATES PATENT OFFICE.

WILLIAM H. MARSHALL, OF DENVER, COLORADO, ASSIGNOR, BY MESNE ASSIGNMENTS, TO LOUIS F. RAYMOND, OF CHICAGO, ILLINOIS.

HUMIDIFIER FOR INTERNAL-COMBUSTION ENGINES.

Application filed July 2, 1917. Serial No. 178,218.

*To all whom it may concern:*

Be it known that I, WILLIAM H. MARSHALL, a citizen of the United States, residing at the city and county of Denver, and State of Colorado, have invented certain new and useful Improvements in Humidifiers for Internal-Combustion Engines; and I do declare the following to be a full, clear, and exact description of the invention, such as will enable others skilled in the art to which it appertains to make and use the same, reference being had to the accompanying drawings and to the characters of reference marked thereon, which form a part of this specification.

My invention relates to means for introducing moisture into internal combustion engines for the purpose of increasing the efficiency of the engine. That the introduction of moisture into the cylinders of internal combustion engines increases the efficiency of the engine for a given quantity of gasoline or other fuel consumed is well understood. Hence, my object is to provide a novel construction of this character which at the same time shall be exceedingly efficient from a commercial standpoint.

The specific construction consists of a casing whose interior is constructed to discharge any water that may enter the casing from the radiator, or other moisture supply source, and which at the same time shall deliver the necessary moisture to the engine cylinders through the medium of a suitable conduit leading from the top of the casing to the engine intake or intake manifold. One novel feature of the construction consists in the employment of a small tube which is threaded through the overflow conduit of the radiator and connected with the lower part of the casing for the purpose of supplying moisture thereto from the radiator. By virtue of this construction the overflow conduit of the radiator is still left open for the performance of its function, while only the moisture which passes through the small tube threaded therethrough, enters the casing of my improved humidifier. Heretofore, so far as I am aware, the devices which utilize moisture taken from the radiator, employ a conduit which is connected directly with the lower extremity of the overflow conduit of the radiator, thus directing all the overflow contents of the radiator into the moisture supplying device. In constructions of this character a relatively large quantity of water is liable to be carried to the moisture supplying device thus making it more difficult to avoid the introduction of water in liquid form to the cylinders of the engine. Hence, I employ, as heretofore indicated, a very small tube which is threaded through the regular overflow conduit of the radiator, so that when the water boils in the radiator, a large quantity of the liquid overflow will be discharged through the radiator overflow conduit in the usual or ordinary manner.

Another novel feature of my improvement consists in equipping the lower part of the casing with a device for siphoning the water out of a trap in which the water accumulates, whether it be the result of condensing the moisture within the casing or whether the water is in liquid form at the time it enters the casing, as in the event of the overflow due to the boiling of the water in the radiator.

Other features of novelty consist in a special construction of diaphragms and baffles utilized for the purpose of preventing any water in liquid form from reaching the cylinders of the engine.

Having briefly outlined my improvement I will proceed to describe the same in detail, reference being made to the accompanying drawing in which is illustrated an embodiment thereof. In this drawing:

Fig. 1 is an outline elevation of an internal combustion engine equipped with my improvement.

Fig. 2 is a vertical section of the body member of my improved device, the section being taken on the line 2—2, Fig. 3.

Fig. 3 is a horizontal section taken on the line 3—3, Fig. 2.

Fig. 4 is a cross section taken on the line 4—4, Fig. 1, the parts being shown on a larger scale.

Fig. 5 is a fragmentary longitudinal section of the radiator overflow conduit, showing my improved moisture carrying tube threaded therethrough.

Fig. 6 is a fragmentary detail view illustrating the introduction of the moisture tube into the radiator overflow pipe at any desired point between the extremities of the pipe.

The same reference characters indicate the same parts in all the views.

Let the numeral 5 designate an internal combustion engine considered in its entirety and connected in operative relation with a radiator 6. The intake of the engine is designated by the numeral 7. The body member of my improvement is designated in its entirety by the numeral 8 and may be mounted upon the machine in any suitable manner. As shown in the drawing (see Fig. 1) the device is supported within the hood of the engine and normally will be concealed thereby. The manner of supporting it or connecting it with the stationary structure of the machine is immaterial. This member 8 consists of a casing 9 which is vertically disposed or mounted in an upright position. Its upper extremity has an outlet opening with which is connected a conduit 10 which leads from the top of the casing to the intake 7 of the engine. As shown in the drawing, this connection is made at a point designated by the numeral 12 (see Fig. 1). This conduit is provided near the intake with a valve 13, whose valve piece is connected with a crank arm 14, which in turn is connected, as shown at 15, with the inner extremity of a rod 16, whose opposite extremity passes through the dash 17 of the automobile, its upper extremity 18 being accessible to the person in charge of the machine. The opening at the top of the casing 9 I will designate by the numeral 19. This opening is hooded by an interior housing 20 which as shown in the drawing has a saw toothed upper edge 21 for the entrance of the moisture from the chamber of the casing, the housing, which is approximately semi-spherical in shape, serving to prevent the possibility of water in liquid form passing into the conduit 10. Below the housing 20 and arranged centrally of the casing are two mesh diaphragms designated by the numerals 22 and 23 respectively. These diaphragms are arranged one above the other and suitably spaced. Below the lowermost mesh diaphragm 23, is placed a third diaphragm or baffle plate 24, which is secured to the inner surface of the casing, as shown at 25, except that a segment of the diaphragm is turned downwardly for a short distance in order to form an opening 26 of sufficient magnitude to permit the passage of the necessary moist air to the upper part of the casing. The depending lip 27 of this diaphragm, has a tendency to divert any water in liquid form or of condensation and directs the same downwardly into a trap 28 surrounded by the lower part 29 of the casing. This trap is formed by the wall of the part 29 of the casing and by a hollow cylindrical member 30 which is spaced from the casing wall to form the chamber of the trap. The lower part of this chamber is in communication by means of openings 31, with an inner chamber 32, whose only outlet is at the top where the water may pass by way of suitable openings 33 into a siphon tube 34 which extends downwardly and closes the lower reduced end 35 of the casing. The hollow cylindrical member 30 is closed at the top by a curved plate 36 which directs any water in liquid form or of condensation down into the chamber 28 of the trap, since the edge of the plate 36 is spaced from the inner surface of the casing, as shown at 37.

The moisture which enters the casing is supplied between the diaphragm 24 and the plate 36, through the medium of a small tube 38 which is in communication with the chamber of the casing between the parts 24 and 36 through the medium of a suitable coupling 39. This tube 38 is relatively small and is threaded through the overflow conduit 40 of the radiator, its upper extremity being preferably on a level with the top of the radiator overflow conduit and within the air space at the top of the radiator when the water is in the normal condition.

By virtue of my improved construction my device may be applied to any internal combustion engines, without making any change in the radiator overflow conduit, except to thread the small tube 38 through the said conduit. This may be done by flattening one extremity of the tube, forming a perforation therein and connecting a wire to the flattened end of the tube, after which the wire is first threaded up through the conduit 40 from the bottom until it protrudes at the top thereof, after which by pulling on the wire the tube may be carried through the overflow conduit, its upper extremity being left preferably flush with the top of said conduit and in the air space at the top of the radiator.

From the foregoing description the use and operation of my improved humidifier will be readily understood. Before starting the engine the valve 13 should be closed. After the engine is started this valve should be opened, in which event the necessary moist air will be supplied to the cylinders of the engine through the intake 7, this moisture entering the casing 9 by way of the tube 38 and between the two parts 24 and 36 of the casing. Any water in liquid form or of condensation, which enters through this tube will be deflected downwardly into the chamber 28 of the trap and as soon as the chamber between the cylindrical member 30 and the siphon tube 34 is filled, the water will overflow into the siphon tube and be automatically discharged upon the siphon principle. The function of the diaphragm 24, the mesh diaphragms 22 and 23 and the housing 20, is to prevent any water of condensation, which may at any time exist in the upper portion of the casing, from passing into the moisture carrying conduit 10.

Attention is called to the fact that the moisture tube 38 instead of being passed entirely through the radiator overflow pipe, may be introduced at any desired point above the lower extremity of the pipe, since under some circumstances, or for various reasons it may be desirable to tap the overflow pipe above the lower extremity thereof. This feature is illustrated in Fig. 6 of the drawing.

Having thus described my invention, what I claim is:

1. A humidifier for internal combustion engines, comprising a casing whose lower portion is adapted to be connected with a source of moisture and whose upper portion is adapted to be connected with the engine cylinders, the casing below the moisture inlet being equipped with a water trap provided with a siphon for automatic discharge, and means arranged within the casing between the moisture inlet and the moisture outlet, for preventing water in liquid form from reaching the moisture outlet, said means comprising a baffle plate, a mesh diaphragm and a suspended hood said moisture inlet being situated below said baffle plate and said plate being below said mesh diaphragm.

2. A humidifier for internal combustion engines comprising a casing adapted to be placed in communication with a source of moisture and also in communication with the engine, the casing below the moisture inlet being equipped with a water trap, a siphon for discharging water from said trap, and means arranged between the moisture inlet and the moisture outlet for preventing water in liquid form from reaching the outlet, comprising a baffle plate having an opening, spaced mesh diaphragms and a housing suspended from the top of the casing and having openings at its upper edge for the purpose set forth said moisture inlet being situated below said baffle plate and said plate being below said mesh diaphragm.

3. A humidifier comprising a casing having a moisture inlet at its lower portion and a moisture outlet at its upper portion, the lower end of the casing having a water trap for automatic removal of water from the casing without admission of air thereto, a baffle plate arranged above said trap and said inlet and closed adjacent said inlet but having an opening at a point remote from the inlet, and a mesh diaphragm above said plate and below said outlet.

4. A humidifier comprising a casing having a moisture inlet in its lower portion and a moisture outlet in its upper portion, a water trap in the lower end of the casing for automatic removal of water from the casing and adapted to prevent admission of air therethrough to the casing and to maintain the water level in the lower portion of the casing, a baffle plate above said inlet and said trap and at all times above the water level, said plate being closed to prevent the passage of water adjacent said inlet but having an opening at a point remote from said inlet, and a mesh diaphragm above said plate and below said moisture outlet.

5. A humidifier comprising a casing having a moisture inlet in its lower portion and a moisture outlet in its upper portion, a water trap in the lower end of the casing for automatic removal of water from the casing and adapted to prevent admission of air therethrough to the casing, a baffle plate above said inlet and trap, said trap having means to maintain the water level below the baffle plate, said plate being closed adjacent said inlet to prevent the passage of water therethrough and having an opening remote from the inlet, a lip directed downward on said plate adjacent the edge of said opening to deflect water accumulated on the under face of the plate, and a mesh diaphragm above said plate and below said mosture outlet.

6. A humidifier comprising a casing having a moisture inlet in its lower portion and a moisture outlet in its upper portion, a water trap provided at its lower end, a baffle plate above said trap and said inlet closed adjacent said inlet and having an opening remote from said inlet, and a mesh diaphragm above said baffle plate and below said outlet, said trap comprising a hollow member in the lower end of the casing closed at its top and communicating with the interior of the casing at its bottom and a tube projecting through the lower end of the casing and opening into the top portion of the chamber within the hollow member.

7. A humidifier comprising a casing having a moisture inlet at its lower portion and a moisture outlet at its upper portion, the lower end of the casing having a water trap for removal of water without the admission of air, a concavo-convex baffle plate arranged above said trap and said inlet, and a concavo-convex mesh diaphragm above said plate and below said outlet.

8. A humidifier comprising a casing having a moisture inlet at its lower portion and a moisture outlet at the upper portion, the lower end of the casing having a water trap for removal of water without admission of air, a baffle plate having a depending water-intercepting portion, said plate being above the trap and the inlet, and a concavo-convex mesh diaphragm above the plate and below the outlet.

In testimony whereof I affix my signature.

WILLIAM H. MARSHALL.